US011908401B2

(12) United States Patent
Choi et al.

(10) Patent No.: US 11,908,401 B2
(45) **Date of Patent: *Feb. 20, 2024**

(54) DRIVING CONTROLLER, DISPLAY APPARATUS INCLUDING THE SAME AND METHOD OF DRIVING DISPLAY PANEL USING THE SAME

(71) Applicant: SAMSUNG DISPLAY CO., LTD., Yongin-si (KR)

(72) Inventors: Eunjin Choi, Yongin-si (KR); Wonjin Seo, Seoul (KR); Kihyun Pyun, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,124

(22) Filed: Mar. 13, 2023

(65) Prior Publication Data

US 2023/0222970 A1 Jul. 13, 2023

Related U.S. Application Data

(63) Continuation of application No. 17/233,260, filed on Apr. 16, 2021, now Pat. No. 11,605,338.

(30) Foreign Application Priority Data

Apr. 16, 2020 (KR) ........................ 10-2020-0045766

(51) Int. Cl.
*G09G 3/3208* (2016.01)

(52) U.S. Cl.
CPC ... *G09G 3/3208* (2013.01); *G09G 2320/0233* (2013.01); *G09G 2320/04* (2013.01);
(Continued)

(58) Field of Classification Search
CPC ......... G09G 3/3208; G09G 2320/0233; G09G 2320/04; G09G 2320/043;
(Continued)

(56) References Cited

U.S. PATENT DOCUMENTS 7,538,821 B2 5/2009 Ahn et al.
7,595,796 B2 9/2009 Ranganathan et al.
(Continued)

FOREIGN PATENT DOCUMENTS

KR 10-1310935 B1 9/2013
KR 10-2016-0092537 A 8/2016
(Continued)

*Primary Examiner* — Michael J Jansen, II
(74) *Attorney, Agent, or Firm* — Lewis Roca Rothgerber Christie LLP

(57) ABSTRACT

A driving controller includes: a logo determiner configured to determine whether or not input image data includes a logo; a logo grayscale value calculator configured to calculate a logo grayscale value of a logo area corresponding to the logo in response to the input image data including the logo; a light emitting element life expectancy determiner configured to determine a life expectancy of a light emitting element corresponding to the logo area; a compensation reference grayscale value generator configured to determine a compensation reference grayscale value according to the life expectancy of the light emitting element corresponding to the logo area; and a logo luminance compensator configured to compare the logo grayscale value to the compensation reference grayscale value to determine whether or not to compensate a luminance of the logo area.

16 Claims, 9 Drawing Sheets

(52) U.S. Cl.
CPC . *G09G 2320/043* (2013.01); *G09G 2320/046* (2013.01); *G09G 2320/048* (2013.01); *G09G 2320/062* (2013.01); *G09G 2320/0686* (2013.01)

(58) Field of Classification Search
CPC ....... G09G 2320/046; G09G 2320/048; G09G 2320/062; G09G 2320/0686
See application file for complete search history.

(56) References Cited

U.S. PATENT DOCUMENTS

| | | | | |
|---|---|---|---|---|
| 8,638,858 | B2 | 1/2014 | Madden et al. | |
| 9,691,353 | B2 | 6/2017 | Joo et al. | |
| 10,410,568 | B2 | 9/2019 | Drzaic et al. | |
| 10,522,100 | B2 | 12/2019 | Jeong et al. | |
| 10,535,309 | B2 | 1/2020 | Ryu et al. | |
| 10,572,965 | B2 | 2/2020 | Kambhatla et al. | |
| 10,748,317 | B2 | 8/2020 | Park | |
| 10,810,926 | B2 | 10/2020 | Kim et al. | |
| 10,916,204 | B2 | 2/2021 | An et al. | |
| 11,164,540 | B2 | 11/2021 | Holland et al. | |
| 11,386,643 | B2 | 7/2022 | Chun et al. | |
| 11,605,338 | B2 * | 3/2023 | Choi | G09G 3/3208 |
| 2005/0237319 | A1 * | 10/2005 | Ranganathan | G09G 5/00 345/214 |
| 2006/0139492 | A1 * | 6/2006 | Ahn | G09G 5/005 348/E5.111 |
| 2007/0296741 | A1 * | 12/2007 | Park | G09G 3/2003 345/83 |
| 2010/0008426 | A1 * | 1/2010 | Madden | G06T 9/00 375/240.18 |
| 2010/0156956 | A1 * | 6/2010 | Madden | G09G 3/20 345/690 |
| 2014/0146071 | A1 * | 5/2014 | Kim | G09G 3/3225 345/589 |
| 2016/0049123 | A1 * | 2/2016 | Jeong | G09G 3/3607 345/88 |
| 2016/0086526 | A1 * | 3/2016 | Kim | G09G 3/007 345/698 |
| 2016/0140905 | A1 * | 5/2016 | Yoo | G09G 3/3233 345/82 |
| 2016/0225344 | A1 * | 8/2016 | Joo | G09G 5/14 |
| 2017/0345378 | A1 * | 11/2017 | Ryu | G09G 3/3225 |
| 2018/0005598 | A1 * | 1/2018 | Kambhatla | G09G 3/3208 |
| 2018/0190174 | A1 * | 7/2018 | Kambhatla | G06T 1/20 |
| 2018/0350289 | A1 * | 12/2018 | Drzaic | G06F 3/0673 |
| 2019/0164503 | A1 * | 5/2019 | An | G09G 3/3266 |
| 2020/0074708 | A1 * | 3/2020 | Park | G06T 11/60 |
| 2021/0103765 | A1 * | 4/2021 | Chun | G09G 5/36 |
| 2021/0183333 | A1 * | 6/2021 | Holland | G09G 3/3208 |

FOREIGN PATENT DOCUMENTS

| | | |
|---|---|---|
| KR | 10-2017-0003210 A | 1/2017 |
| KR | 10-1885824 B1 | 8/2018 |

* cited by examiner

DRIVING CONTROLLER, DISPLAY APPARATUS INCLUDING THE SAME AND METHOD OF DRIVING DISPLAY PANEL USING THE SAME

CROSS-REFERENCE TO RELATED APPLICATIONS

This application is a continuation of U.S. patent application Ser. No. 17/233,260, filed Apr. 16, 2021, which claims priority to and the benefit of Korean Patent Application No. 10-2020-0045766, filed Apr. 16, 2020, the entire content of both of which is incorporated herein by reference.

BACKGROUND

1. Field

Aspects of some example embodiments of the present inventive concept relate to a driving controller, a display apparatus including the driving controller and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

The image displayed on the display panel may include a logo representing a broadcaster, an image producer, an image provider, or the like. The logo may be displayed at a constant position for a long time in the image, and the logo displayed at the constant position for a long time may cause a deterioration of a light emitting element corresponding to the position of the logo and a life reduction of the light emitting element.

The above information disclosed in this Background section is only for enhancement of understanding of the background and therefore the information discussed in this Background section does not necessarily constitute prior art.

SUMMARY

Aspects of some example embodiments of the present inventive concept relate to a driving controller, a display apparatus including the driving controller and a method of driving a display panel using the display apparatus. For example, aspects of some example embodiments of the present inventive concept relate to a driving controller minimizing or reducing a deterioration of a light emitting element and a life reduction of the light emitting element by determining whether or not to compensate a luminance of a logo area according to a life expectancy of the light emitting element, a display apparatus including the driving controller and a method of driving a display panel using the display apparatus.

Aspects of some example embodiments of the present inventive concept include a driving controller minimizing a deterioration of a light emitting element and a life reduction of the light emitting element by determining whether to compensate a luminance of a logo area according to a life expectancy of the light emitting element.

Aspects of some example embodiments of the present inventive concept also include a display apparatus including the driving controller.

Aspects of some example embodiments of the present inventive concept also include a method of driving a display panel using the display apparatus.

According to some example embodiments of the present inventive concept, a driving controller includes a logo determiner, a logo grayscale value calculator, a light emitting element life expectancy determiner, a compensation reference grayscale value generator and a logo luminance compensator. The logo determiner is configured to determine whether input image data include a logo or not. The logo grayscale value calculator is configured to calculate a logo grayscale value of a logo area corresponding to the logo when the input image data include the logo. The light emitting element life expectancy determiner is configured to determine a life expectancy of a light emitting element corresponding to the logo area. The compensation reference grayscale value generator is configured to determine a compensation reference grayscale value according to the life expectancy of the light emitting element corresponding to the logo area. The logo luminance compensator is configured to compare the logo grayscale value to the compensation reference grayscale value to determine whether to compensate a luminance of the logo area.

According to some example embodiments, the logo determiner may be configured to compare a grayscale value of a previous frame of the input image data and a grayscale value of a present frame of the input image data to determine a fixed image included in the input image data.

According to some example embodiments, when the fixed image is maintained over a reference time period, the logo determiner may be configured to determine that the input image data include the logo.

According to some example embodiments, when the fixed image is maintained over the reference time period and a size of the fixed image is included in a reference size range, the logo determiner may be configured to determine that the input image data include the logo.

According to some example embodiments, the display panel may include a plurality of display blocks. The light emitting element life expectancy determiner may be configured to extract the life expectancy of the light emitting element of the display block corresponding to the logo area among the plurality of display blocks of the display panel.

According to some example embodiments, the display panel may include a plurality of display blocks. The light emitting element life expectancy determiner may be configured to determine a number of display blocks corresponding to the logo area among the plurality of display blocks of the display panel.

According to some example embodiments, when the number of the display block corresponding to the logo area is one, the light emitting element life expectancy determiner may be configured to extract the life expectancy of the light emitting element of the display block corresponding to the logo area.

According to some example embodiments, when the number of the display blocks corresponding to the logo area is greater than one, the light emitting element life expectancy determiner may be configured to extract a minimum life expectancy of the light emitting elements of the display blocks corresponding to the logo areas.

According to some example embodiments, as the life expectancy of the light emitting element corresponding to the logo area is great, the compensation reference grayscale value generator may be configured to set the compensation reference grayscale value to be great. As the life expectancy of the light emitting element corresponding to the logo area is little, the compensation reference grayscale value generator may be configured to set the compensation reference grayscale value to be little.

According to some example embodiments, when the life expectancy of the light emitting element corresponding to the logo area is less than a minimum preset life expectancy, the compensation reference grayscale value generator may be configured to set the compensation reference grayscale value to a minimum preset reference grayscale value.

According to some example embodiments, when the life expectancy of the light emitting element corresponding to the logo area is greater than a maximum preset life expectancy, the compensation reference grayscale value generator may be configured to set the compensation reference grayscale value to a maximum preset reference grayscale value.

According to some example embodiments, when the logo grayscale value is equal to or greater than the compensation reference grayscale value, the logo luminance compensator may be configured to operate a logo luminance compensation to decrease the luminance of the logo area. When the logo grayscale value is less than the compensation reference grayscale value, the logo luminance compensator may be configured not to operate the logo luminance compensation to decrease the luminance of the logo area.

According to some example embodiments of the present inventive concept, a display apparatus includes a display panel, a driving controller and a data driver. The display panel is configured to display an image based on input image data. The driving controller is configured to generate a data signal based on the input image data. The driving controller includes a logo determiner, a logo grayscale value calculator, a light emitting element life expectancy determiner, a compensation reference grayscale value generator and a logo luminance compensator. The logo determiner is configured to determine whether the input image data include a logo or not. The logo grayscale value calculator is configured to calculate a logo grayscale value of a logo area corresponding to the logo when the input image data include the logo. The light emitting element life expectancy determiner is configured to determine a life expectancy of a light emitting element corresponding to the logo area. The compensation reference grayscale value generator is configured to determine a compensation reference grayscale value according to the life expectancy of the light emitting element corresponding to the logo area. The logo luminance compensator is configured to compare the logo grayscale value to the compensation reference grayscale value to determine whether to compensate a luminance of the logo area. The data driver is configured to convert the data signal to a data voltage and output the data voltage to the display panel.

According to some example embodiments, the driving controller and the data driver may form an integrated driver.

According to some example embodiments, as the life expectancy of the light emitting element corresponding to the logo area is great, the compensation reference grayscale value generator may be configured to set the compensation reference grayscale value to be great. As the life expectancy of the light emitting element corresponding to the logo area is little, the compensation reference grayscale value generator may be configured to set the compensation reference grayscale value to be little.

According to some example embodiments, when the life expectancy of the light emitting element corresponding to the logo area is less than a minimum preset life expectancy, the compensation reference grayscale value generator may be configured to set the compensation reference grayscale value to a minimum preset reference grayscale value.

According to some example embodiments, when the life expectancy of the light emitting element corresponding to the logo area is greater than a maximum preset life expectancy, the compensation reference grayscale value generator may be configured to set the compensation reference grayscale value to a maximum preset reference grayscale value.

According to some example embodiments, when the logo grayscale value is equal to or greater than the compensation reference grayscale value, the logo luminance compensator may be configured to operate a logo luminance compensation to decrease the luminance of the logo area. When the logo grayscale value is less than the compensation reference grayscale value, the logo luminance compensator may be configured not to operate the logo luminance compensation to decrease the luminance of the logo area.

According to some example embodiments of the present inventive concept, a method includes determining whether input image data include a logo or not, calculating a logo grayscale value of a logo area corresponding to the logo when the input image data include the logo, determining a life expectancy of a light emitting element corresponding to the logo area, determining a compensation reference grayscale value according to the life expectancy of the light emitting element corresponding to the logo area, comparing the logo grayscale value to the compensation reference grayscale value to compensate a luminance of the logo area, generating a data signal based on the input image data having the compensated luminance of the logo area, converting the data signal to a data voltage and outputting the data voltage to the display panel.

According to some example embodiments, when the logo grayscale value is equal to or greater than the compensation reference grayscale value, the luminance of the logo area may be decreased. When the logo grayscale value is less than the compensation reference grayscale value, the luminance of the logo area may not be decreased.

According to the driving controller, the display apparatus and the method of driving the display panel, the compensation reference grayscale value may be determined according to the life expectancy of the light emitting element corresponding to the logo area. When the logo grayscale value of the logo area is equal to or greater than the compensation reference grayscale value, the luminance of the logo area may be compensated. When the logo grayscale value of the logo area is less than the compensation reference grayscale value, the luminance of the logo area may not be compensated.

Thus, the compensation reference grayscale value may be determined based on the life expectancy of the light emitting element corresponding to the logo area and whether to compensate the luminance of the logo area may be determined according to the compensation reference grayscale value so that the deterioration of the light emitting element and the life reduction of the light emitting element may be minimized or reduced.

BRIEF DESCRIPTION OF THE DRAWINGS

The above and other features and characteristics of embodiments according to the present inventive concept will become more apparent by describing in more detail aspects of some example embodiments thereof with reference to the accompanying drawings, in which.

DETAILED DESCRIPTION

Hereinafter, aspects of some example embodiments of the present inventive concept will be explained in more detail with reference to the accompanying drawings.

Figure 1:
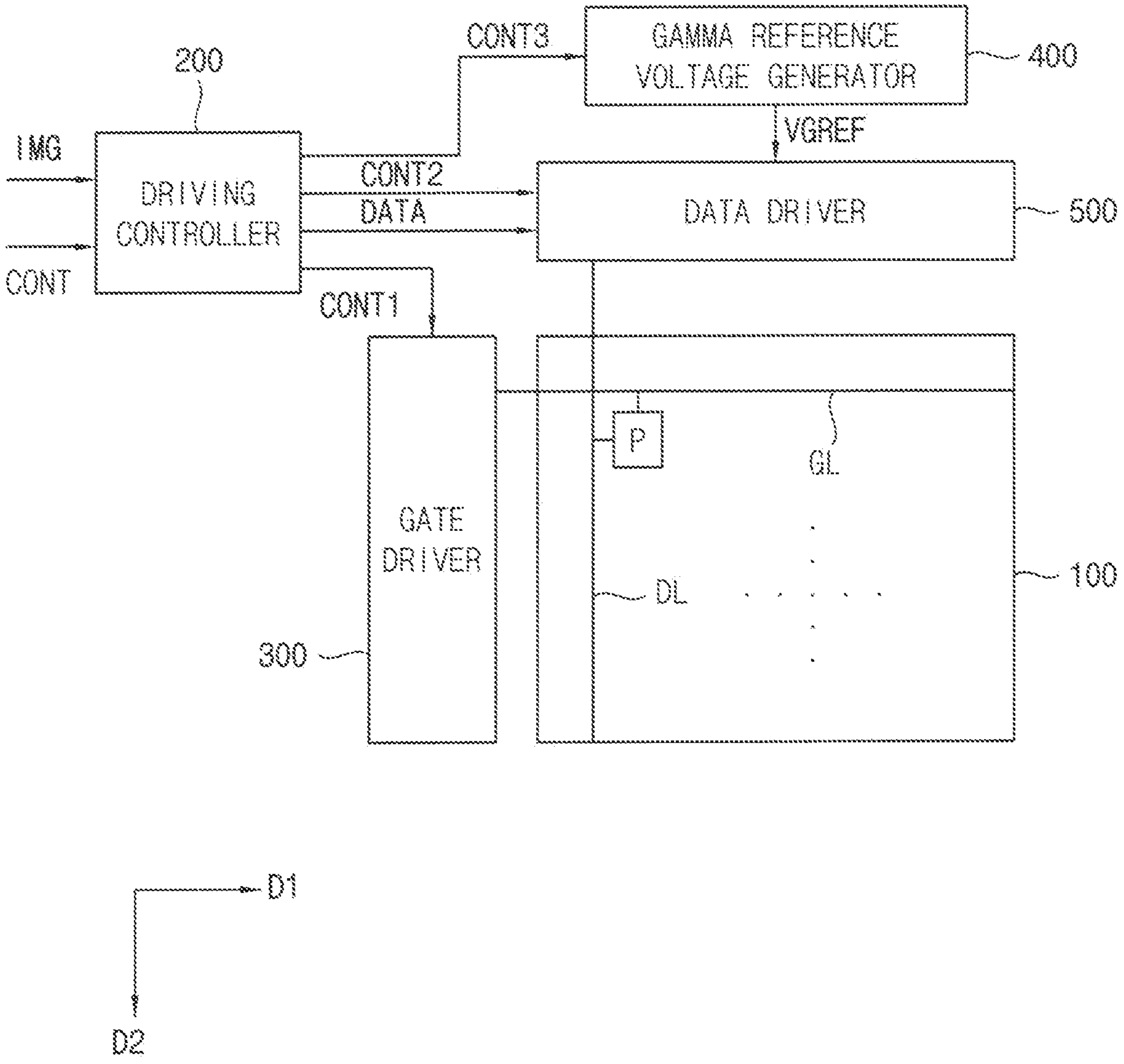
FIG. 1 is a block diagram illustrating a display apparatus according to some example embodiments of the present inventive concept.

FIG. 1 is a block diagram illustrating a display apparatus according to some example embodiments of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

The display panel 100 has a display region on which an image is displayed and a peripheral region adjacent to the display region.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 3 to 6 in more detail.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some example embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
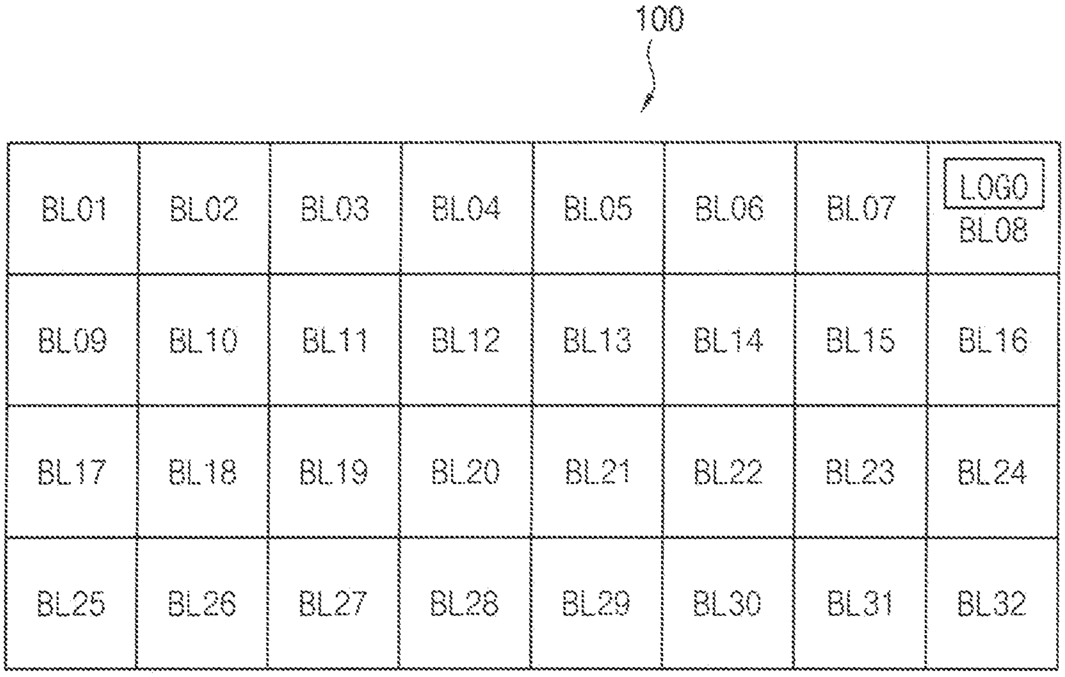
FIG. 2 is a conceptual diagram illustrating a display panel of FIG. 1 according to some example embodiments.

FIG. 2 is a conceptual diagram illustrating the display panel 100 of FIG. 1.

Referring to FIGS. 1 and 2, the display panel 100 may include a plurality of display blocks BL01 to BL32. Although the display panel 100 includes 32 display blocks BL01 to BL32 located in a four by eight matrix, embodiments according to the present inventive concept may not be limited to the number of the display blocks. Each of the display blocks BL01 to BL32 may include a plurality of pixels P. Each pixel P may include a light emitting element.

In FIG. 2, for example, a logo representing a broadcaster, an image producer or an image provider may be located in an eighth display block BL08.

Figure 3:
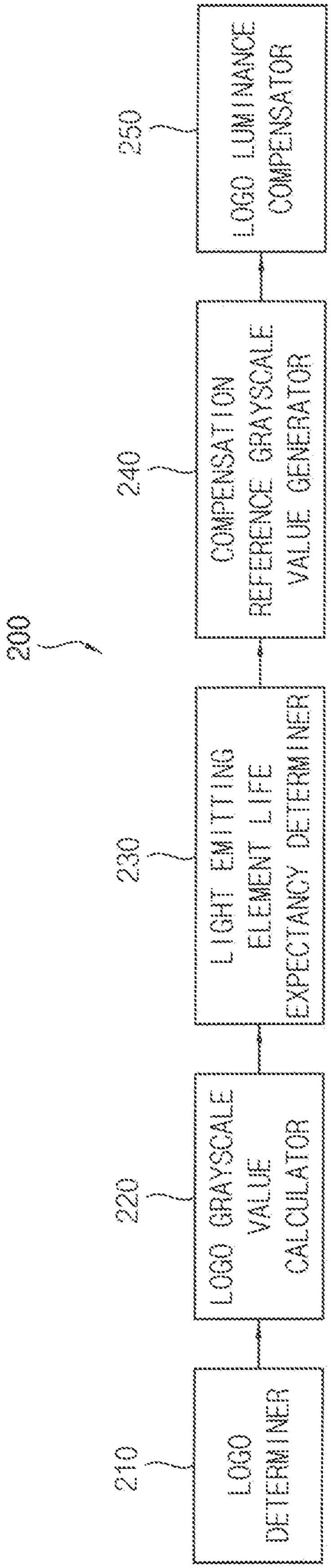
FIG. 3 is a block diagram illustrating a driving controller of FIG. 1 according to some example embodiments.
Figure 4:
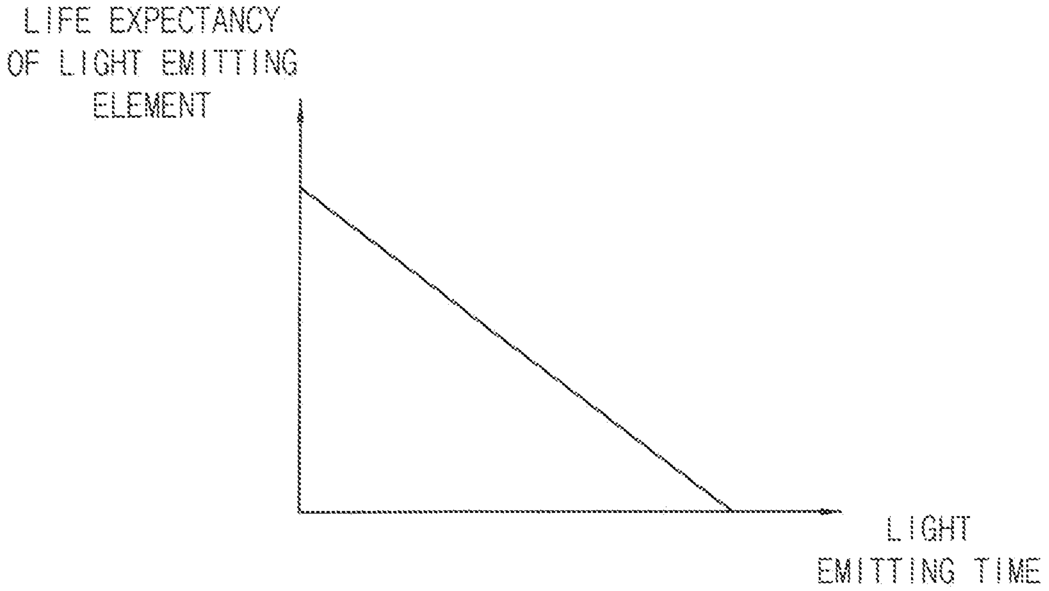
FIG. 4 is a graph illustrating an operation of a light emitting element life expectancy determiner of FIG. 3 according to some example embodiments.
Figure 5:
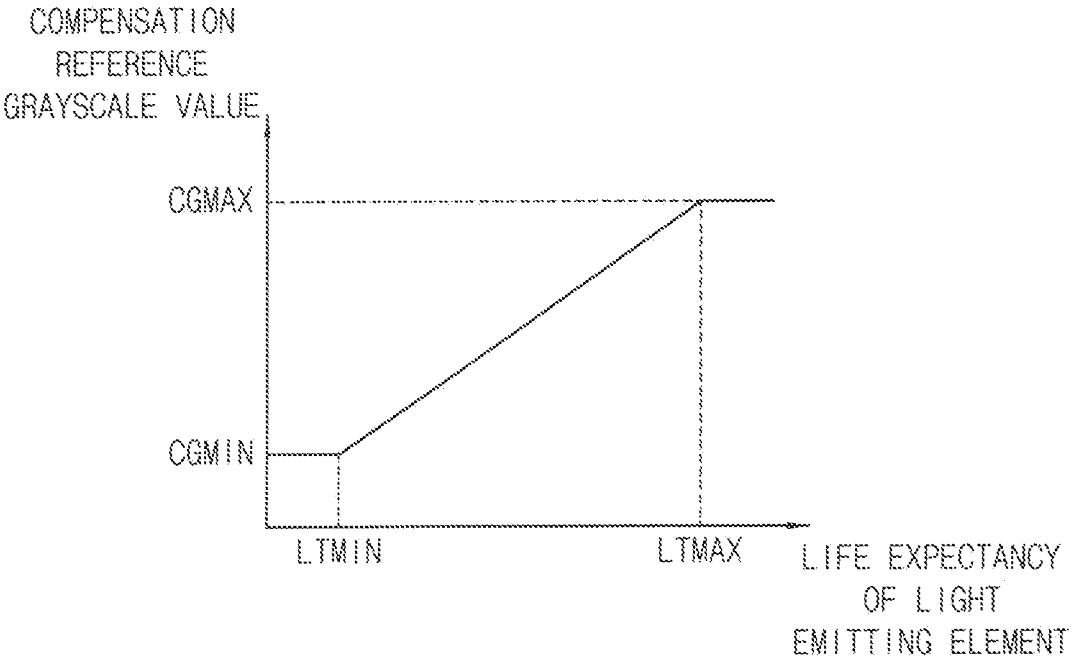
FIG. 5 is a graph illustrating an operation of a compensation reference grayscale value generator of FIG. 3 according to some example embodiments.
Figure 6:
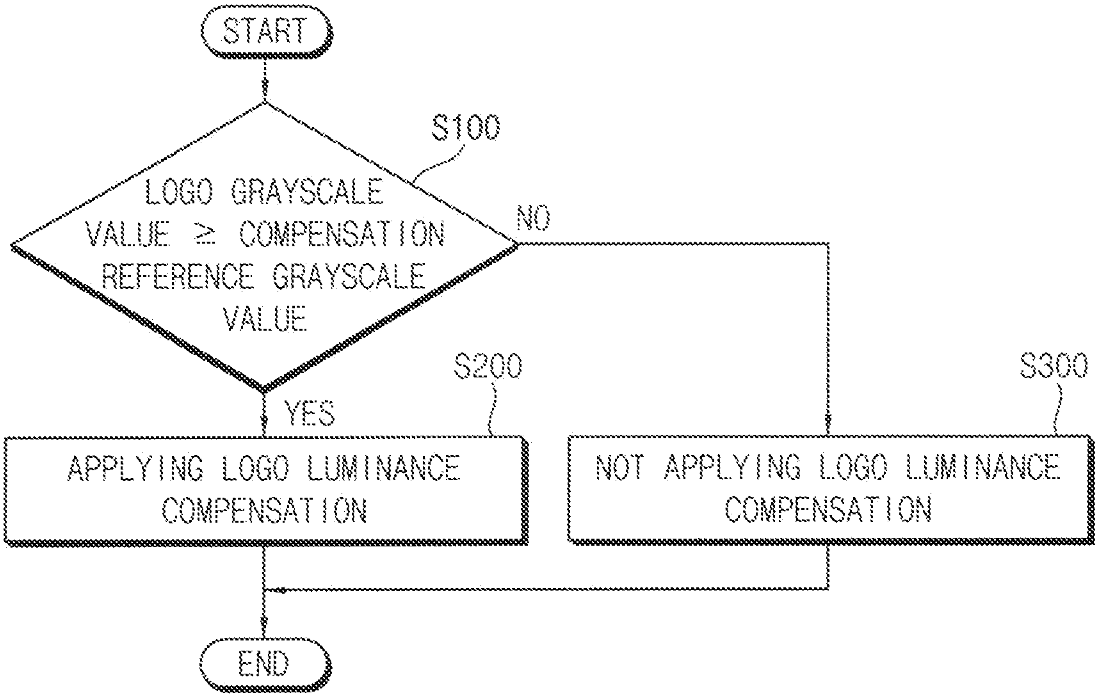
FIG. 6 is a flowchart diagram illustrating an operation of a logo luminance compensator of FIG. 3 according to some example embodiments.

FIG. 3 is a block diagram illustrating the driving controller 200 of FIG. 1. FIG. 4 is a graph illustrating an operation of a light emitting element life expectancy determiner 230 of FIG. 3. FIG. 5 is a graph illustrating an operation of a compensation reference grayscale value generator 240 of FIG. 3. FIG. 6 is a flowchart diagram illustrating an operation of a logo luminance compensator 250 of FIG. 3.

Referring to FIGS. 1 to 6, the driving controller 200 may include a logo determiner 210, a logo grayscale value calculator 220, a light emitting element life expectancy determiner 230, a compensation reference grayscale value generator 240 and a logo luminance compensator 250.

The logo determiner 210 may determine whether the logo is included in the input image data IMG or not.

For example, the logo determiner 210 may compare a grayscale value of a previous frame of the input image data IMG and a grayscale value of a present frame of the input image data IMG to determine a fixed image included in the input image data IMG. For example, the logo determiner may determine the fixed mage using a local block sum. The local block sum means a sum of the grayscale values of each display block in a frame.

For example, when the fixed image is maintained over a reference time period, the logo determiner 210 may determine that the logo is included in the input image data IMG. For example, the reference time period may be ten frames. Herein, when the fixed image is maintained in ten frames, the logo determiner 210 may determine that the fixed image is the logo. Although the reference time period is ten frames in the present example embodiments, embodiments according to the present inventive concept may not be limited thereto. The reference time period may be properly set to determine the logo.

For example, when the fixed image is maintained over the reference time period and a size of the fixed image is included in a reference size range, the logo determiner 210 may determine that the logo is included in the input image data IMG. For example, the reference size range may be set or predetermined corresponding to sizes of general logo areas. Thus, when the fixed image is greater than a maximum value of the reference size range or the fixed image is less than a minimum value of the reference size range, the fixed image may not be determined as the logo.

When the input image data IMG includes the logo, the logo grayscale value calculator 220 calculates a logo grayscale value of a logo area corresponding to the logo.

The light emitting element life expectancy determiner 230 may determine a life expectancy of a light emitting element corresponding to the logo area.

For example, the driving controller 200 may respectively store the life expectancies of the light emitting elements for the display blocks BL01 to BL322. For example, each display block may have the one life expectancy. For example, the one life expectancy for each display block may be a minimum value among the life expectancies of the light emitting elements in the display block. For example, the one life expectancy for each display block may be an average value of the life expectancies of the light emitting elements in the display block. As shown in FIG. 4, the life expectancy of the light emitting element may be in inverse proportion to a light emitting time of the light emitting element. The driving controller 200 may count the light emitting time of the light emitting element and store the life expectancy of the light emitting element. In addition, the life expectancy of the light emitting element may be in inverse proportion to a luminance of the light emitting element. The driving controller 200 may store the life expectancy of the light emitting element based on the light emitting time of the light emitting element and the luminance of the light emitting element.

According to some example embodiments, the display panel 100 may be an organic light emitting display panel including an organic light emitting element. The light emitting element may be the organic light emitting element. For example, the light emitting element may be an organic light emitting diode.

The light emitting element life expectancy determiner 230 may determine the life expectancy of the light emitting element of the display block (e.g. BL08 of FIG. 2) corresponding to the logo area.

The compensation reference grayscale value generator 240 may determine a compensation reference grayscale value according to the life expectancy of the light emitting element corresponding to the logo area.

As shown in FIG. 5, in response to the life expectancy of the light emitting element corresponding to the logo area being relatively high or great (e.g., greater than a threshold (e.g., a set or predetermined threshold) amount or life expectancy), the compensation reference grayscale value generator 240 may set the compensation reference grayscale value to be higher (e.g., higher than a set or predetermined level or threshold). According to some example embodiments, the compensation reference grayscale value generator may proportionally (e.g., along a set or predetermined curve) or linearly increase or set the reference grayscale value as the life expectancy increases. Correspondingly, as the life expectancy of the light emitting element corresponding to the logo area is relatively lower, the compensation reference grayscale value generator 240 may set the compensation reference grayscale value to be proportionally relatively lower.

When the life expectancy of the light emitting element is relatively high, the compensation reference grayscale value may be set to be proportionally relatively high so that a target of the luminance reduction of the logo area may be relatively low. In contrast, when the life expectancy of the light emitting element is relatively low, the compensation reference grayscale value may be set to be relatively low so that a target of the luminance reduction of the logo area may be relatively high. Even when the life expectancy of the light emitting element is relatively low, if the compensation reference grayscale value has a great value, the luminance of the logo area may not be reduced, so that the deterioration of the light emitting element having a high degree of deterioration is accelerated, and the life expectancy of the light emitting element having a little life expectancy may be further reduced.

When the life expectancy of the light emitting element corresponding to the logo area is less than a minimum preset life expectancy LTMIN, the compensation reference grayscale value generator 240 may set the compensation reference grayscale value to a minimum preset reference grayscale value CGMIN.

When the compensation reference grayscale value is set to be lower than the minimum preset reference grayscale value CGMIN because the life expectancy of the light emitting element is relatively low, the luminance of a relatively dark logo may be reduced so that the logo may not be shown to a user and accordingly the display quality may be deteriorated.

When the life expectancy of the light emitting element corresponding to the logo area is greater than a maximum preset life expectancy LTMAX, the compensation reference grayscale value generator 240 may set the compensation reference grayscale value to a maximum preset reference grayscale value CGMAX.

When the compensation reference grayscale value is set to be higher than the maximum preset reference grayscale value CGMAX because the life expectancy of the light emitting element is great, the luminance of a very bright logo may not be reduced so that the light emitting element corresponding to the logo area may be rapidly deteriorated and the life expectancy logo of the light emitting element corresponding to the logo area may be relatively rapidly reduced.

The logo luminance compensator 250 may compare the logo grayscale value to the compensation reference grayscale value to determine whether to compensate the luminance of the logo area (operation S100).

As shown in FIG. 6, when the logo grayscale value is equal to or greater than the compensation reference grayscale value, the logo luminance compensator 250 may operate a logo luminance compensation to decrease the luminance of the logo area (operation S200). When the logo grayscale value is less than the compensation reference grayscale value, the logo luminance compensator 250 may not operate the logo luminance compensation to decrease the luminance of the logo area (operation S300).

Herein, the compensation reference grayscale value may be generated by the compensation reference grayscale value generator 240 based on the life expectancy of the light emitting element. Thus, when the life expectancy of the light emitting element is relatively low, the logo luminance compensator 250 determine whether or not to compensate the luminance of the logo area based on the relatively low compensation reference grayscale value. When the life expectancy of the light emitting element is relatively high, the logo luminance compensator 250 determine whether or not to compensate the luminance of the logo area based on the relatively high compensation reference grayscale value.

According to some example embodiments, the compensation reference grayscale value may be determined according to the life expectancy of the light emitting element corresponding to the logo area. When the logo grayscale value of the logo area is equal to or greater than the compensation reference grayscale value, the luminance of the logo area may be compensated. When the logo grayscale value of the logo area is less than the compensation reference grayscale value, the luminance of the logo area may not be compensated.

Thus, the compensation reference grayscale value may be determined based on the life expectancy of the light emitting element corresponding to the logo area and whether to compensate the luminance of the logo area may be determined according to the compensation reference grayscale value so that the deterioration of the light emitting element and the life reduction of the light emitting element may be minimized or reduced.

Figure 7:
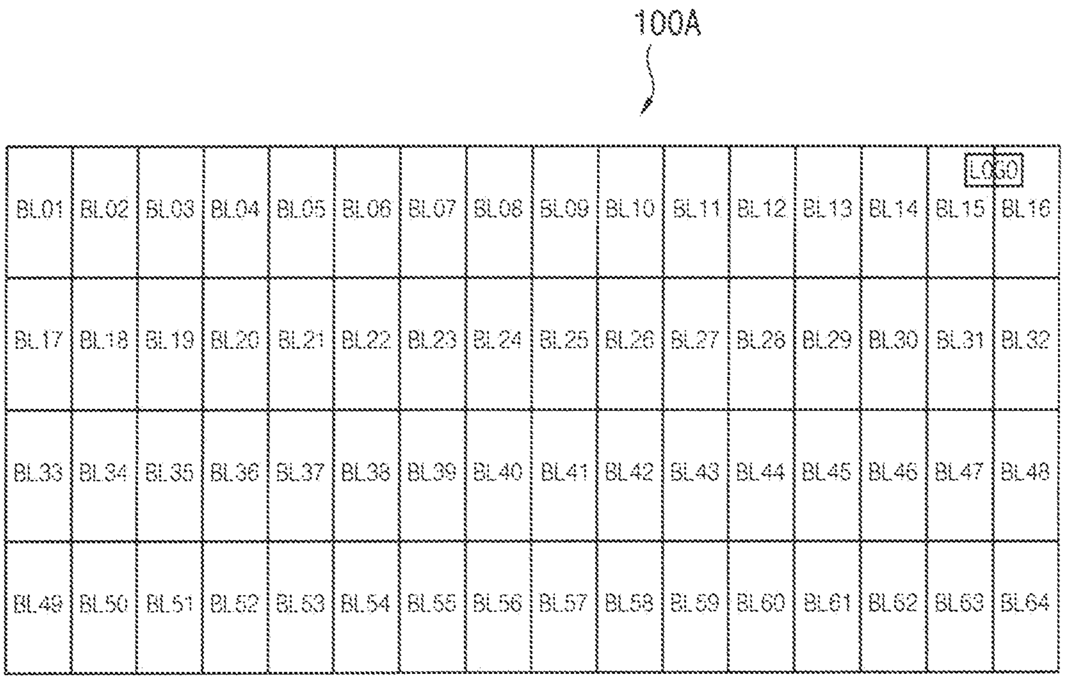
FIG. 7 is a conceptual diagram illustrating a display panel of a display apparatus according to some example embodiments of the present inventive concept.
Figure 8:
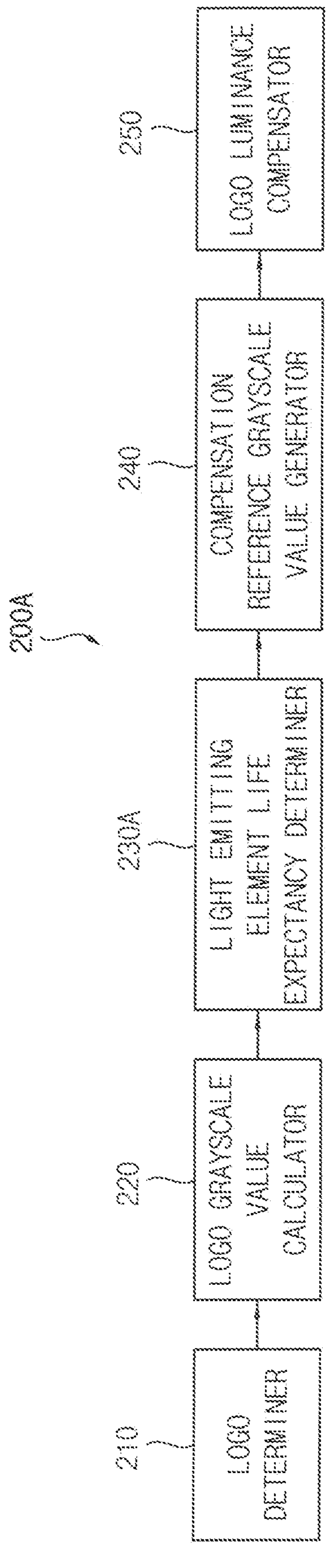
FIG. 8 is a block diagram illustrating a driving controller of FIG. 7 according to some example embodiments.
Figure 9:
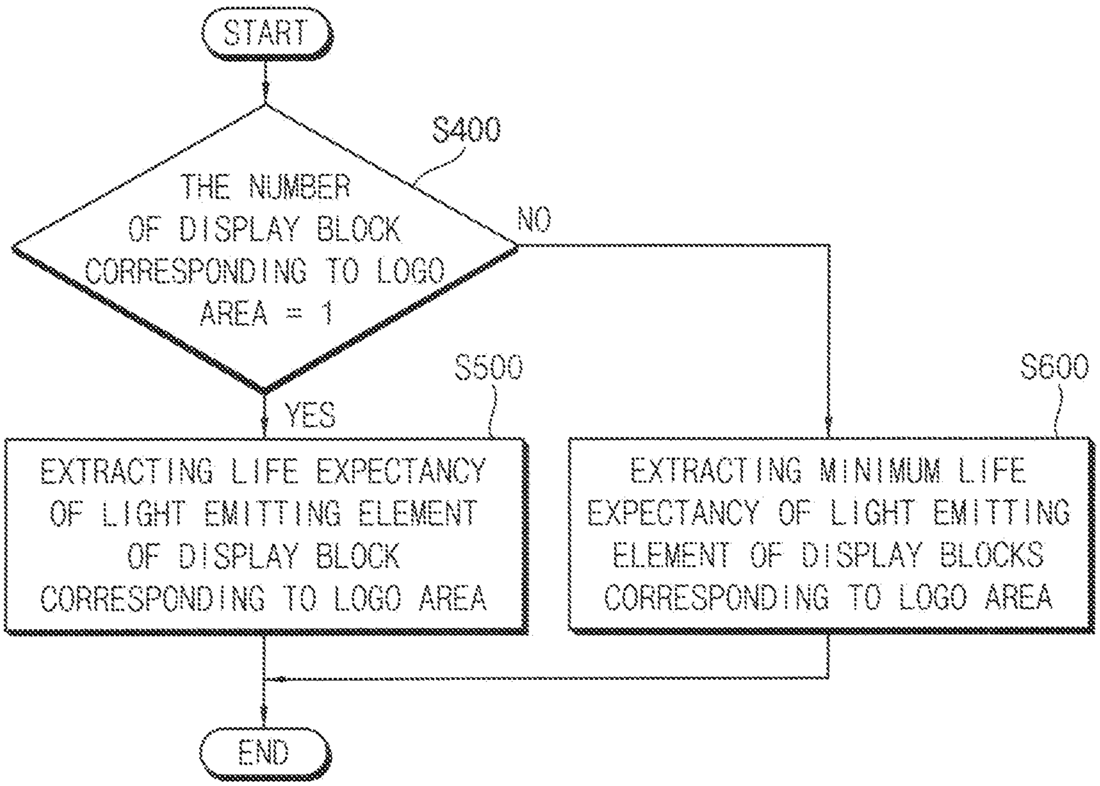
FIG. 9 is a flowchart diagram illustrating an operation of a light emitting element life expectancy determiner of FIG. 8 according to some example embodiments.

FIG. 7 is a conceptual diagram illustrating a display panel 100A of a display apparatus according to some example embodiments of the present inventive concept. FIG. 8 is a block diagram illustrating a driving controller 200A of FIG. 7. FIG. 9 is a flowchart diagram illustrating an operation of a light emitting element life expectancy determiner 230A of FIG. 8.

The driving controller, the display apparatus and the method of driving the display panel according to the present example embodiments is substantially the same as the driving controller, the display apparatus and the method of driving the display panel of the previous example embodiments explained with respect to FIGS. 1 to 6 except for the display block of the display panel and the structure and the operation of the light emitting element life expectancy determiner. Thus, the same reference numerals will be used to refer to the same or like parts as those described in the previous example embodiments of FIGS. 1 to 6 and some repetitive explanation concerning the above elements may be omitted.

Referring to FIGS. 1 and 4 to 9, the display apparatus includes a display panel 100A and a display panel driver. The display panel driver includes a driving controller 200A, a gate driver 300, a gamma reference voltage generator 400 and a data driver 500.

The display panel 100A may include a plurality of display blocks BL01 to BL64. Although the display panel 100A includes sixty four display blocks BL01 to BL64 in a four by sixteen matrix in the present example embodiments, embodiments according to the present inventive concept may not be limited to the number of the display blocks.

In FIG. 7, for example, a logo representing a broadcaster, an image producer or an image provider may be located in a fifteenth display block BL15 and a sixteenth display block BL16.

The driving controller 200A may include a logo determiner 210, a logo grayscale value calculator 220, a light emitting element life expectancy determiner 230A, a compensation reference grayscale value generator 240 and a logo luminance compensator 250.

The light emitting element life expectancy determiner 230A may determine a life expectancy of a light emitting element corresponding to the logo area.

As shown in FIG. 9, according to some example embodiments, the light emitting element life expectancy determiner 230A may determine a number of the display blocks corresponding to the logo area (operation S400).

When the number of the display block corresponding to the logo area is one, the light emitting element life expectancy determiner 230A may extract the life expectancy of the light emitting element of the display block corresponding to the logo area (operation S500).

When the number of the display blocks corresponding to the logo area is greater than one, the light emitting element life expectancy determiner 230A may extract the minimum life expectancy of the light emitting elements of the display blocks corresponding to the logo areas (operation S600).

When the logo is located in the fifteenth display block BL15 and the sixteenth display block BL16 as shown in FIG. 7, the light emitting element life expectancy determiner 230A may extract a lower value between the life expectancy of the light emitting element of the fifteenth display block BL15 and the life expectancy of the light emitting element of the sixteenth display block BL16.

The compensation reference grayscale value generator 240 may determine a compensation reference grayscale value according to the life expectancy of the light emitting element corresponding to the logo area.

As shown in FIG. 5, when the life expectancy of the light emitting element corresponding to the logo area is relatively high, the compensation reference grayscale value generator 240 may set the compensation reference grayscale value to be proportionally relatively high (e.g., along a set or predetermined curve or ratio). As the life expectancy of the light emitting element corresponding to the logo area is little, the compensation reference grayscale value generator 240 may set the compensation reference grayscale value to be little.

When the life expectancy of the light emitting element corresponding to the logo area is less than a minimum preset life expectancy LTMIN, the compensation reference grayscale value generator 240 may set the compensation reference grayscale value to a minimum preset reference grayscale value CGMIN.

When the life expectancy of the light emitting element corresponding to the logo area is greater than a maximum preset life expectancy LTMAX, the compensation reference grayscale value generator 240 may set the compensation reference grayscale value to a maximum preset reference grayscale value CGMAX.

The logo luminance compensator 250 may compare the logo grayscale value to the compensation reference grayscale value to determine whether or not to compensate or adjust the luminance of the logo area (operation S100).

As shown in FIG. 6, when the logo grayscale value is equal to or greater than the compensation reference grayscale value, the logo luminance compensator 250 may operate a logo luminance compensation to decrease the luminance of the logo area (operation S200). When the logo grayscale value is less than the compensation reference grayscale value, the logo luminance compensator 250 may not operate the logo luminance compensation to decrease the luminance of the logo area (operation S300).

According to some example embodiments, the compensation reference grayscale value may be determined according to the life expectancy of the light emitting element corresponding to the logo area. When the logo grayscale value of the logo area is equal to or greater than the compensation reference grayscale value, the luminance of the logo area may be compensated. When the logo grayscale value of the logo area is less than the compensation reference grayscale value, the luminance of the logo area may not be compensated.

Thus, the compensation reference grayscale value may be determined based on the life expectancy of the light emitting element corresponding to the logo area and whether to compensate the luminance of the logo area may be determined according to the compensation reference grayscale value so that the deterioration of the light emitting element and the life reduction of the light emitting element may be minimized or reduced.

Figure 10:
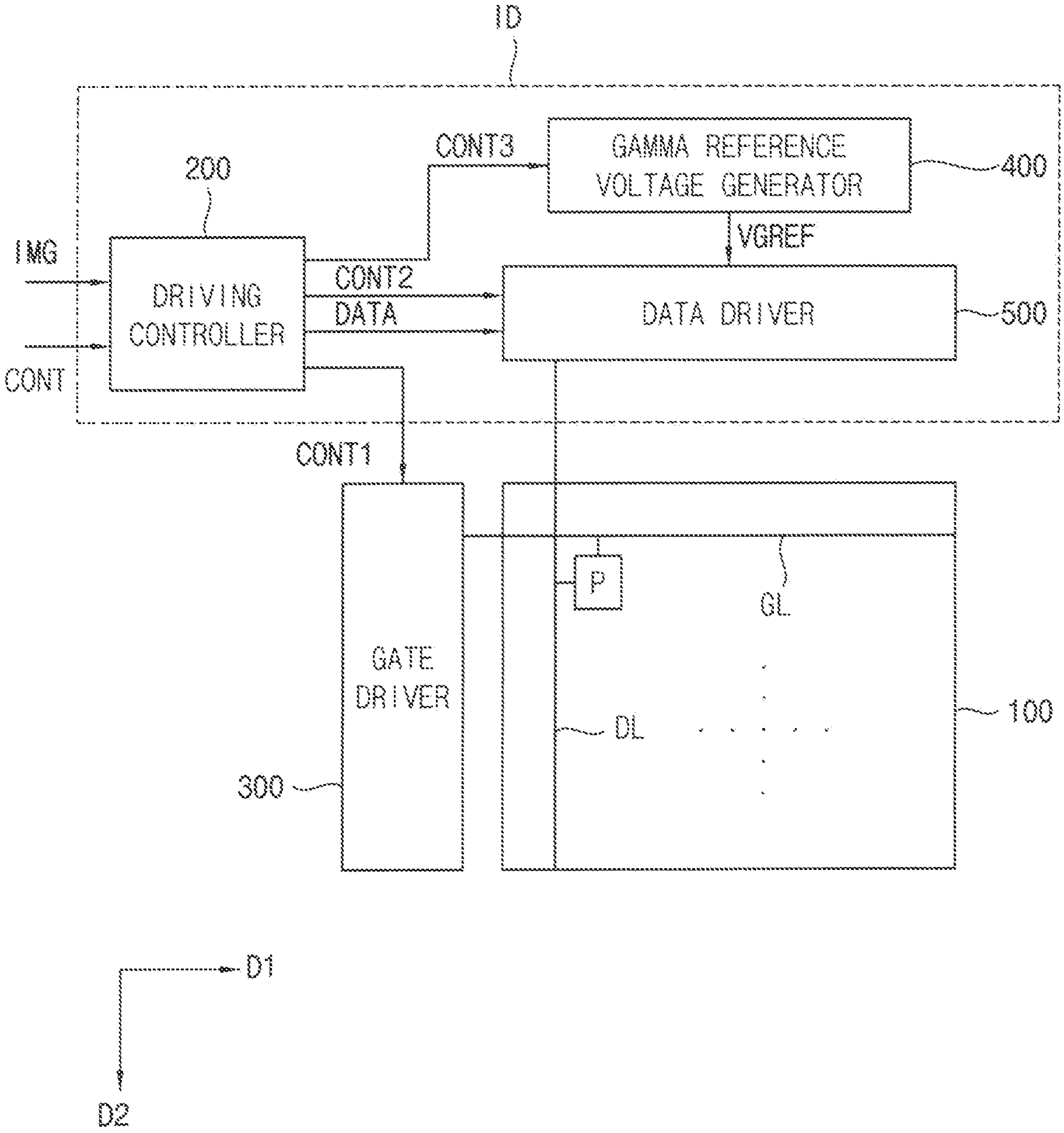
FIG. 10 is a block diagram illustrating a display apparatus according to some example embodiments of the present inventive concept.

FIG. 10 is a block diagram illustrating a display apparatus according to some example embodiments of the present inventive concept.

The driving controller, the display apparatus and the method of driving the display panel according to the present example embodiments is substantially the same as the driving controller, the display apparatus and the method of driving the display panel of the previous example embodiments explained with respect to FIGS. 1 to 6 except for the structure of the display panel driver. Thus, the same reference numerals will be used to refer to the same or like parts as those described in the previous example embodiments of FIGS. 1 to 6 and some repetitive explanation concerning the above elements may be omitted.

Referring to FIGS. 2 to 6 and 10, the display apparatus includes a display panel 100 and a display panel driver. The display panel driver includes a driving controller 200, a gate driver 300, a gamma reference voltage generator 400 and a data driver 500.

According to some example embodiments, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to an integrated driver ID. For example, the integrated driver ID may be called to a timing controller embedded data driver (TED).

The driving controller 200 may include a logo determiner 210, a logo grayscale value calculator 220, a light emitting element life expectancy determiner 230, a compensation reference grayscale value generator 240 and a logo luminance compensator 250.

The logo determiner 210 may determine whether or not the logo is included in the input image data IMG or not.

When the input image data IMG includes the logo, the logo grayscale value calculator 220 calculates a logo grayscale value of a logo area corresponding to the logo.

The light emitting element life expectancy determiner 230 may determine a life expectancy of a light emitting element corresponding to the logo area.

The compensation reference grayscale value generator 240 may determine a compensation reference grayscale value according to the life expectancy of the light emitting element corresponding to the logo area.

As shown in FIG. 5, as the life expectancy of the light emitting element corresponding to the logo area is great, the compensation reference grayscale value generator 240 may set the compensation reference grayscale value to be great. As the life expectancy of the light emitting element corresponding to the logo area is little, the compensation reference grayscale value generator 240 may set the compensation reference grayscale value to be little.

When the life expectancy of the light emitting element corresponding to the logo area is less than a minimum preset life expectancy LTMIN, the compensation reference grayscale value generator 240 may set the compensation reference grayscale value to a minimum preset reference grayscale value CGMIN.

When the life expectancy of the light emitting element corresponding to the logo area is greater than a maximum preset life expectancy LTMAX, the compensation reference grayscale value generator 240 may set the compensation reference grayscale value to a maximum preset reference grayscale value CGMAX.

The logo luminance compensator 250 may compare the logo grayscale value to the compensation reference grayscale value to determine whether to compensate the luminance of the logo area (operation S100).

As shown in FIG. 6, when the logo grayscale value is equal to or greater than the compensation reference grayscale value, the logo luminance compensator 250 may operate a logo luminance compensation to decrease the luminance of the logo area (operation S200). When the logo grayscale value is less than the compensation reference grayscale value, the logo luminance compensator 250 may not operate the logo luminance compensation to decrease the luminance of the logo area (operation S300).

According to some example embodiments, the compensation reference grayscale value may be determined according to the life expectancy of the light emitting element corresponding to the logo area. When the logo grayscale value of the logo area is equal to or greater than the compensation reference grayscale value, the luminance of the logo area may be compensated. When the logo grayscale value of the logo area is less than the compensation reference grayscale value, the luminance of the logo area may not be compensated.

Thus, the compensation reference grayscale value may be determined based on the life expectancy of the light emitting element corresponding to the logo area and whether to compensate the luminance of the logo area may be determined according to the compensation reference grayscale value so that the deterioration of the light emitting element and the life reduction of the light emitting element may be minimized or reduced.

According to some example embodiments, the deterioration of the light emitting element and the life reduction of the light emitting element may be minimized or reduced.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of embodiments according to the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A driving controller comprising:

a logo determiner configured to determine whether or not input image data includes a logo;

a logo grayscale value calculator configured to calculate a logo grayscale value of a logo area corresponding to the logo in response to the input image data including the logo;

a light emitting element life expectancy determiner configured to determine a life expectancy of a light emitting element corresponding to the logo area;

a compensation reference grayscale value generator configured to determine a compensation reference grayscale value according to the life expectancy of the light emitting element corresponding to the logo area; and a logo luminance compensator configured to compare the logo grayscale value to the compensation reference grayscale value to determine whether or not to compensate a luminance of the logo area, wherein the logo determiner is configured to determine that the input image data includes the logo in response to a fixed image being maintained over a reference time period and a size of the fixed image being included in a reference size range.

2. The driving controller of claim 1, wherein the logo determiner is configured to compare a grayscale value of a previous frame of the input image data and a grayscale value of a present frame of the input image data to determine the fixed image is included in the input image data.

3. The driving controller of claim 2, wherein the logo determiner is configured to determine that the input image data includes the logo in response to the fixed image being maintained over the reference time period.

4. The driving controller of claim 1, wherein the light emitting element life expectancy determiner is configured to extract the life expectancy of the light emitting element of a display block corresponding to the logo area among a plurality of display blocks of a display panel.

5. The driving controller of claim 1, wherein the light emitting element life expectancy determiner is configured to determine a number of display blocks corresponding to the logo area among a plurality of display blocks of a display panel.

6. The driving controller of claim 5, wherein the light emitting element life expectancy determiner is configured to extract the life expectancy of the light emitting element of a display block corresponding to the logo area in response to a number of the display blocks corresponding to the logo area being one.

7. The driving controller of claim 5, wherein the light emitting element life expectancy determiner is configured to extract a minimum life expectancy of light emitting elements of the display blocks corresponding to the logo areas in response to the number of the display blocks corresponding to the logo area being greater than one.

8. The driving controller of claim 1, wherein the compensation reference grayscale value generator is configured to set the compensation reference grayscale value in proportion to the life expectancy of the light emitting element along a predetermined curve.

9. The driving controller of claim 8, wherein the compensation reference grayscale value generator is configured to set the compensation reference grayscale value to a minimum preset reference grayscale value in response to the life expectancy of the light emitting element corresponding to the logo area being less than a minimum preset life expectancy.

10. The driving controller of claim 8, wherein the compensation reference grayscale value generator is configured to set the compensation reference grayscale value to a maximum preset reference grayscale value in response to the life expectancy of the light emitting element corresponding to the logo area being greater than a maximum preset life expectancy.

11. A display apparatus comprising:

a display panel configured to display an image based on input image data;

a driving controller configured to generate a data signal based on the input image data, the driving controller comprising:

a logo determiner configured to determine whether or not the input image data includes a logo;

a logo grayscale value calculator configured to calculate a logo grayscale value of a logo area corresponding to the logo in response to the input image data including the logo;

a light emitting element life expectancy determiner configured to determine a life expectancy of a light emitting element corresponding to the logo area;

a compensation reference grayscale value generator configured to determine a compensation reference grayscale value according to the life expectancy of the light emitting element corresponding to the logo area;

a logo luminance compensator configured to compare the logo grayscale value to the compensation reference grayscale value to determine whether or not to compensate a luminance of the logo area; and a data driver configured to convert the data signal to a data voltage and to output the data voltage to the display panel, wherein the logo determiner is configured to determine that the input image data includes the logo in response to a fixed image being maintained over a reference time period and a size of the fixed image being included in a reference size range.

12. The display apparatus of claim 11, wherein the driving controller and the data driver form an integrated driver.

13. The display apparatus of claim 11, wherein the compensation reference grayscale value generator is configured to set the compensation reference grayscale value in proportion to the life expectancy of the light emitting element corresponding to the logo area.

14. The display apparatus of claim 13, wherein the compensation reference grayscale value generator is configured to set the compensation reference grayscale value to a minimum preset reference grayscale value in response to the life expectancy of the light emitting element corresponding to the logo area being less than a minimum preset life expectancy.

15. The display apparatus of claim 13, wherein the compensation reference grayscale value generator is configured to set the compensation reference grayscale value to a maximum preset reference grayscale value in response to the life expectancy of the light emitting element corresponding to the logo area being greater than a maximum preset life expectancy.

16. A method of driving a display panel, the method comprising:

determining whether or not input image data includes a logo;

calculating a logo grayscale value of a logo area corresponding to the logo in response to the input image data including the logo;

determining a life expectancy of a light emitting element corresponding to the logo area;

determining a compensation reference grayscale value according to the life expectancy of the light emitting element corresponding to the logo area;

comparing the logo grayscale value to the compensation reference grayscale value to compensate a luminance of the logo area;

generating a data signal based on the input image data having the compensated luminance of the logo area;

converting the data signal to a data voltage; and outputting the data voltage to the display panel, wherein the input image data is determined to include the logo in response to a fixed image being maintained over a reference time period and a size of the fixed image being included in a reference size range.

* * * * *